US009921007B2

(12) United States Patent
Harper et al.

(10) Patent No.: US 9,921,007 B2
(45) Date of Patent: Mar. 20, 2018

(54) LAMINATED HEAT EXCHANGER INCLUDING A HEAT SINK AND A THERMOELECTRIC DEVICE

(71) Applicant: BAE SYSTEMS PLC, London (GB)

(72) Inventors: Richard John Harper, Chelmsford (GB); Nicholas Chandler, Chelmsford (GB)

(73) Assignee: BAE SYSTEMS PLC, London (GB)

(*) Notice: Subject to any disclaimer, the term of this patent is extended or adjusted under 35 U.S.C. 154(b) by 78 days.

(21) Appl. No.: 14/772,409

(22) PCT Filed: Feb. 24, 2014

(86) PCT No.: PCT/GB2014/050551
§ 371 (c)(1),
(2) Date: Sep. 3, 2015

(87) PCT Pub. No.: WO2014/135844
PCT Pub. Date: Sep. 12, 2014

(65) Prior Publication Data
US 2016/0003557 A1    Jan. 7, 2016

(30) Foreign Application Priority Data

Mar. 6, 2013  (EP) .................................... 13275048
Mar. 6, 2013  (GB) .................................. 1304029.0

(51) Int. Cl.
*F25B 21/00*  (2006.01)
*F28F 3/04*   (2006.01)
(Continued)

(52) U.S. Cl.
CPC ............... *F28F 3/04* (2013.01); *B64D 13/06* (2013.01); *B64D 13/08* (2013.01); *F25B 21/02* (2013.01);
(Continued)

(58) Field of Classification Search
CPC . F28F 3/04; F28F 13/003; F28F 13/06; B64D 13/08; B64D 13/06; F28D 9/0062; F25B 21/02
See application file for complete search history.

(56) References Cited

U.S. PATENT DOCUMENTS 5,255,520 A    10/1993  O'Geary
5,761,909 A *   6/1998  Hughes .................. F25B 21/02
                                                 165/DIG. 9
(Continued)

FOREIGN PATENT DOCUMENTS

CN    102903839 A  *  1/2013
DE    1801088 A1     5/1970
(Continued)

OTHER PUBLICATIONS

Abstract of CN 102903839 A; Chen; Jan. 2013.*
(Continued)

*Primary Examiner* — Keith Raymond
*Assistant Examiner* — Steve Tanenbaum
(74) *Attorney, Agent, or Firm* — Maine Cernota & Rardin (57) ABSTRACT

A heat exchanger assembly (201) comprises: a hot fluid flow channel (210); a cold fluid flow channel (220); and a heat exchanger (230) disposed between the channels. The heat exchanger comprises a heat sink (240) and a thermoelectric device (250). In some embodiments the fluid flow channels (210, 220) may be arranged to provide a cross-flow of the hot and cold fluids.

13 Claims, 4 Drawing Sheets (51) Int. Cl.
  *B64D 13/06* (2006.01)
  *F25B 21/02* (2006.01)
  *F28F 13/00* (2006.01)
  *F28F 13/06* (2006.01)
  *F28D 9/00* (2006.01)
  *B64D 13/08* (2006.01)
  *F28D 21/00* (2006.01)

(52) U.S. Cl.
  CPC .......... *F28D 9/0062* (2013.01); *F28F 13/003* (2013.01); *F28F 13/06* (2013.01); *F25B 2321/023* (2013.01); *F28D 2021/0021* (2013.01); *F28F 2013/006* (2013.01); *Y02T 50/56* (2013.01)

(56) References Cited

U.S. PATENT DOCUMENTS

| | | | | |
|---|---|---|---|---|
| 2002/0139123 | A1* | 10/2002 | Bell | F02G 1/043 62/3.7 |
| 2007/0101602 | A1 | 5/2007 | Bae et al. | |
| 2008/0271462 | A1* | 11/2008 | Hoyle | F25B 21/02 62/3.3 |
| 2010/0186399 | A1* | 7/2010 | Huttinger | H01L 35/30 60/320 |
| 2011/0154811 | A1 | 6/2011 | Simonnin | |
| 2011/0197597 | A1 | 8/2011 | Chen et al. | |
| 2012/0125015 | A1* | 5/2012 | Renze | F25B 21/02 62/3.7 |
| 2012/0152511 | A1* | 6/2012 | Chang | B60H 1/00428 165/202 |

FOREIGN PATENT DOCUMENTS

| | | |
|---|---|---|
| EP | 1892484 A1 | 2/2008 |
| JP | 2001082828 A | 3/2001 |
| WO | 2004054007 A2 | 6/2004 |
| WO | 2012095646 A1 | 7/2012 |

OTHER PUBLICATIONS

EP Search Report dated Aug. 14, 2013 of Patent Application No. EP13275048.0 filed Mar. 6, 2013.
GB Search report dated Aug. 30, 2013 of Patent Application No. GB1304029.0 filed Mar. 6, 2013.
PCT Search Report dated Apr. 17, 2014 of Patent Application No. PCT/GB2014/050551 filed Feb. 24, 2014.

* cited by examiner

LAMINATED HEAT EXCHANGER INCLUDING A HEAT SINK AND A THERMOELECTRIC DEVICE

RELATED APPLICATIONS

This application is a national phase application filed under 35 USC § 371 of PCT Application No. PCT/GB2014/050551 with an International filing date of 24 Feb. 2014 which claims priority of GB Patent Application 1304029.0 filed 6 Mar. 2013 and EP Patent Application 13275048.0 filed 6 Mar. 2013. Each of these applications is herein incorporated by reference in their entirety for all purposes.

FIELD OF THE INVENTION

The present invention relates to a heat exchanger assembly.

BACKGROUND OF THE INVENTION

A Heat exchanger for cooling air, which may for example be used for thermal management in an aircraft (for example a Medium Altitude Long Endurance Aircraft), has been disclosed in the Applicants earlier International Patent Application WO2012/095646, the contents of which is incorporated herein by reference.

Figure 1:
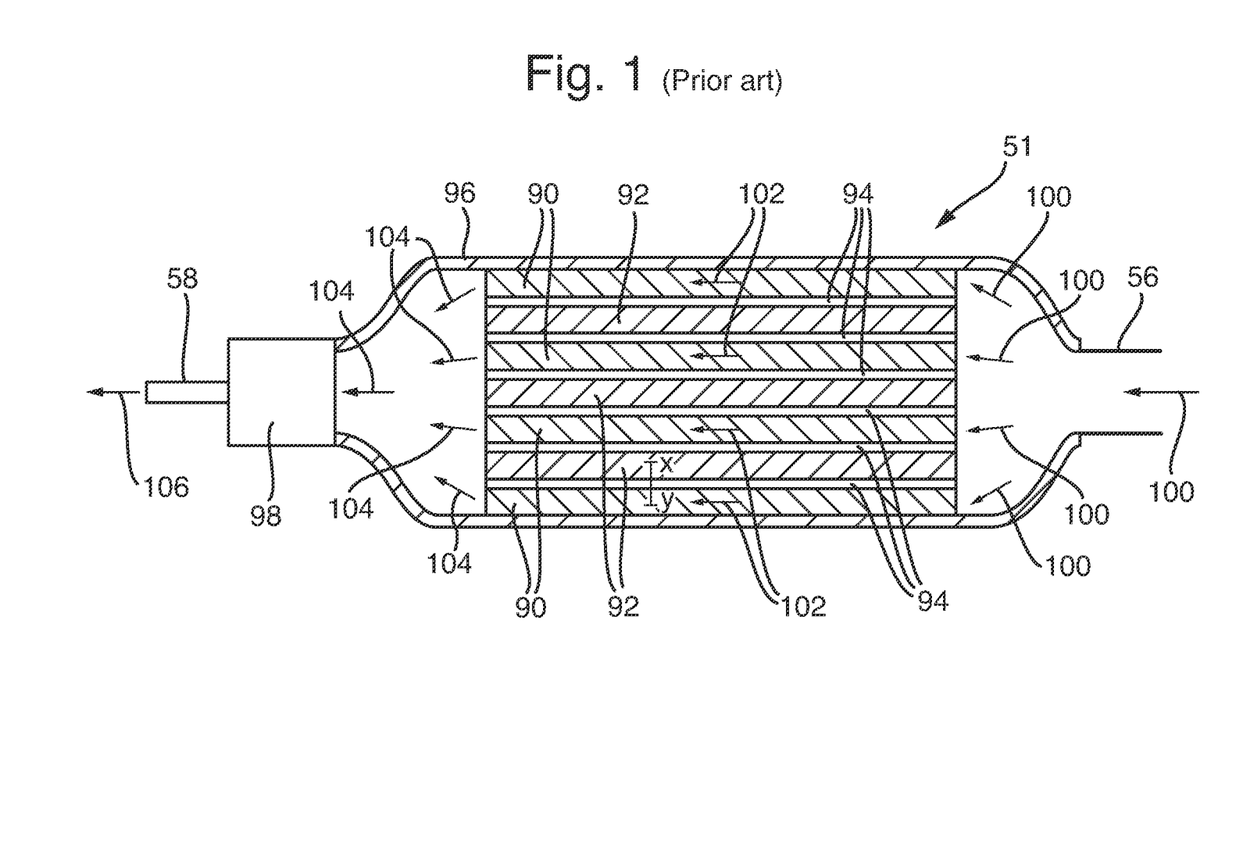
FIG. 1 is a schematic view of a prior art heat exchanger for cooling air.

This application discloses a heat exchanger as shown in FIG. 1. The heat exchanger 51 comprises a laminated stack of air flow channels 90 interlaced with heat sink layers 92. The heat exchanger 51 further comprises a plurality of thermoelectric devices 94 positioned between each air flow channels 90 and heat sink layers 92. The laminated stack is surrounded by an insulation jacket 96. The input to the insulation jacket/laminated stack is provided by the input 56. The output of the insulation jacket/laminated stack may feed into a water extractor 98. The output of the water extractor 98 is output 58.

In operation, input air 100 enters the heat exchanger 51 and flows (as indicated by reference numeral 102 in FIG. 1) along the air flow channels 90, then exits the airflow channels 90 as cooled output air 104. The cooled output air 104 then flows through water extractor 98 and then exits as cooled and dried output air 106. Heat is extracted from the air 102 flowing along the air flow channel 90 and transferred via the thermoelectric device 94 into the heat sink layer 92. Thus, in operation, a first surface of the thermoelectric device 94 operates as a cold face, and the other surface of the thermoelectric device operates as a hot face. An electrical current is applied across the thermoelectric device 94, thus establishing an additional temperature difference between the hot face and the cold face. By such provision and use of the thermoelectric device, the heat transfer is made more efficient. Fins are provided extending outwards into the air flow channel and heat sink layers to further render the heat transfer process more efficient.

It will be appreciated that the heat exchanger disclosed in International Patent Application WO2012/095646 is specifically arranged for cooling of a fluid (i.e. it is arranged to remove heat from a fluid passing through the heat exchanger). However, in some applications it is desirable to provide a two way heat exchange such that a first relatively hot fluid may be passed through the heat exchanger so as to be cooled while a while a second relatively cold fluid passes through the heat exchanger to be heated. Embodiments of the invention seek to provide an improved heat exchanger for such two-way heat exchange.

SUMMARY OF THE INVENTION

According to one aspect of the invention there is provided a heat exchanger assembly comprising: a hot fluid flow channel; a cold fluid flow channel; and a heat exchanger disposed between the channels, wherein the heat exchanger comprises a heat sink and a thermoelectric device.

Advantageously, the thermoelectric device may provide efficient heat transfer to the cold fluid flow and the heat sink may provide good heat transfer from the hot fluid.

It will be appreciated that "hot fluid" and "cold fluid" in the context of the invention are relative terms respectively meaning fluid, for example air, which is intended to be either cooled (in the case of "hot fluid") or heated (in the case of "cold fluid") by the heat exchanger.

The fluid flow channels may be arranged to provide a cross-flow of the hot and cold fluids. The flow paths may for example be substantially linear and a cross-flow arrangement may generally mean that the flow paths are non-parallel.

The flow paths may, for example, be arranged such that they intersect when viewed from a first plane (e.g. a horizontal plane or "plan view") but may be spaced apart when viewed from a second plane (e.g. the vertical plane perpendicular to the first plane). In some embodiments, for example, the fluid flow channels are arranged such that the flow through the channels is substantially orthogonal.

The fluid flow channels may be provided with a side wall which is substantially aligned with the inlet of the other of said fluid flow channel to direct fluid flow into the desired flow channel. For example, the, or each, hot fluid flow channel may be provided with a side wall which is substantially aligned with the inlet of the, or each, cold fluid flow channel. Additionally or alternatively, the, or each, cold fluid flow channel may be provided with a side wall which is substantially aligned with the inlet of the, or each, hot fluid flow channel. The inlets and sidewalls may for example be aligned and may for example be coplanar.

Such an arrangement is advantageous in providing a simple arrangement for providing cross-flow in the heat exchanger assembly. For example, the flow into the cold or hot flow channel may be generally directed towards its respective inlet from the heat exchanger input and may simply impinge upon the side wall of the other of the hot or cold flow channel so as to be redirected to the correct inlet. This may for example, avoid the need for complex manifold inlet arrangements to direct the flow accurately to the, or each, flow channel.

The assembly may further comprise a second hot fluid flow channel; and wherein the cold fluid flow channel may be disposed between the first and second hot fluid flow channels. A heat exchanger comprising a heat sink and a thermoelectric device may be disposed between both the first hot fluid channel and the cold fluid channel and the second hot fluid channel and the cold fluid channel. Thus, in a typical arrangement a heat exchanger assembly according to an embodiment of the invention may comprise a series of alternating hot and cold fluid flow channels. Each cold fluid flow channel may, for example, be disposed between a pair of hot fluid flow channels with a heat exchanger on either side of the cold fluid flow channel.

The flow channels and heat exchanger may be provided in a laminated stack.

Advantageously, the heat exchanger assembly according to embodiments of the invention is easily scalable with the number of flow channels selected to meet the particular application, for example by simply increasing the size of the stack. The heat exchanger assembly may, for example, be provided as a modular system which can be stacked into the required size.

The heat sink and thermoelectric device may also be in a laminar arrangement. For example, the heat sink and the thermoelectric device of the heat exchanger are arranged in separate layers.

The thermoelectric device may comprise a plurality of devices embedded or attached to a support structure. For example, the support structure may comprise a thermally insulating layer. The support structure may comprise a synthetic resin bonded fibreglass sheet. The, or each, thermoelectric device may comprise a peltier device.

The heat exchanger may further comprise at least one temperature sensor. The, or each, temperature sensor may, for example, be a thermocouple. The, or each, temperature sensor may be embedded or attached to the support structure. For example, the, or each, temperature sensor may be positioned proximal to a thermoelectric device. For example a plurality of temperature sensors may be positioned on opposing sides of a single thermoelectric device. Alternatively or additionally the, or each, temperature sensor may be positioned between adjacent thermoelectric devices. In some embodiments at least one temperature sensor may be provided on each face of the support structure. The, or each, temperature sensor may be provided in a paired arrangement with a temperature sensor on the opposing side of the support structure.

The, or each, thermoelectric device may abut the cold fluid flow channel. In some embodiments a thermoelectric device may abut both the upper and lower extent of the cold fluid flow channel. For example, the thermoelectric device (and/or the support structure of the thermoelectric device) may define the upper and/or lower extent of the cold fluid channel.

The, or each, heat sink may abut the hot fluid flow channel. The hot fluid flow channel may comprise a support member which defines the upper and/or lower boundary of the channel. Typically both and upper and lower support member may be provided. The, or each, support member may for example provide a physical separation between the hot fluid flow channel and the heat sink (but will, for example, provide a heat transfer path therebetween).

The heat sink may comprise an open mesh, cell, or fin structure which defines the heat sink space and which may support a high specific heat capacity material. The high specific heat capacity material may be a phase change material, for example paraffin wax.

The, or each, fluid flow channels may comprise (and may be defined by) an open mesh, cell or fin structure. For example, the fluid flow channels may comprise a plurality of fins or an open foamed material. The open mesh or cell structure may be formed from a material having a high thermal conductivity to assist heat transfer from the fluid. The fluid flow channels may be formed from aluminium (for example open mesh, cell or fin structure formed from aluminium). The fluid flow channels may, for example, comprise open cell metal foam.

Whilst the invention has been described above, it extends to any inventive combination of features set out above or in the following description or drawings.

BRIEF DESCRIPTION OF THE DRAWINGS

The invention may be performed in various ways and specific embodiments will now be described, by way of example only, and with reference to the accompanying drawings, in which.

DETAILED DESCRIPTION OF AN EMBODIMENT

Figure 2:
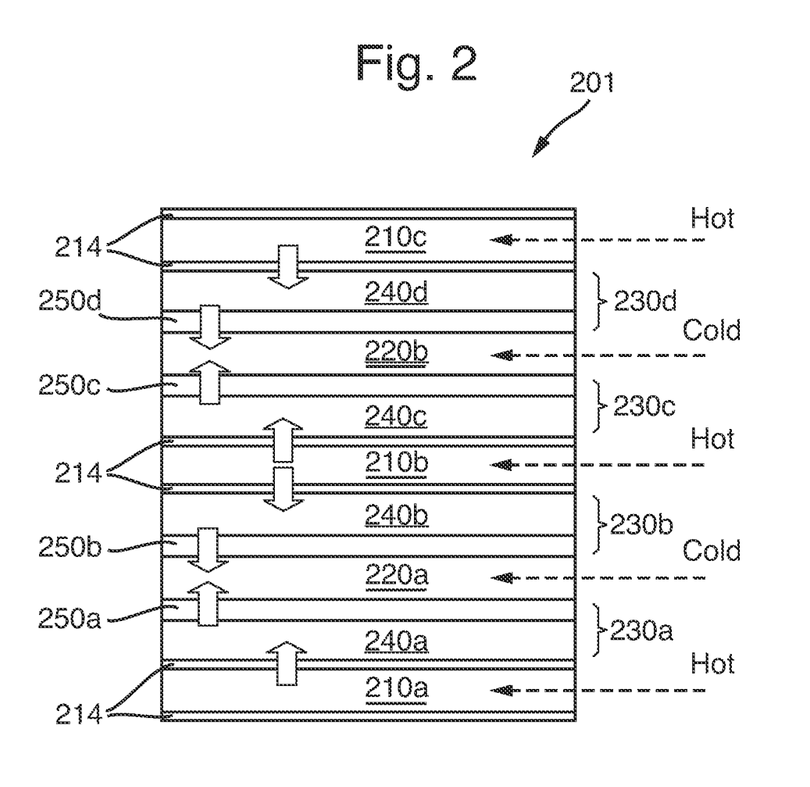
FIG. 2 is a schematic cross-section of a heat exchanger in accordance with an embodiment of the invention.
Figure 3:
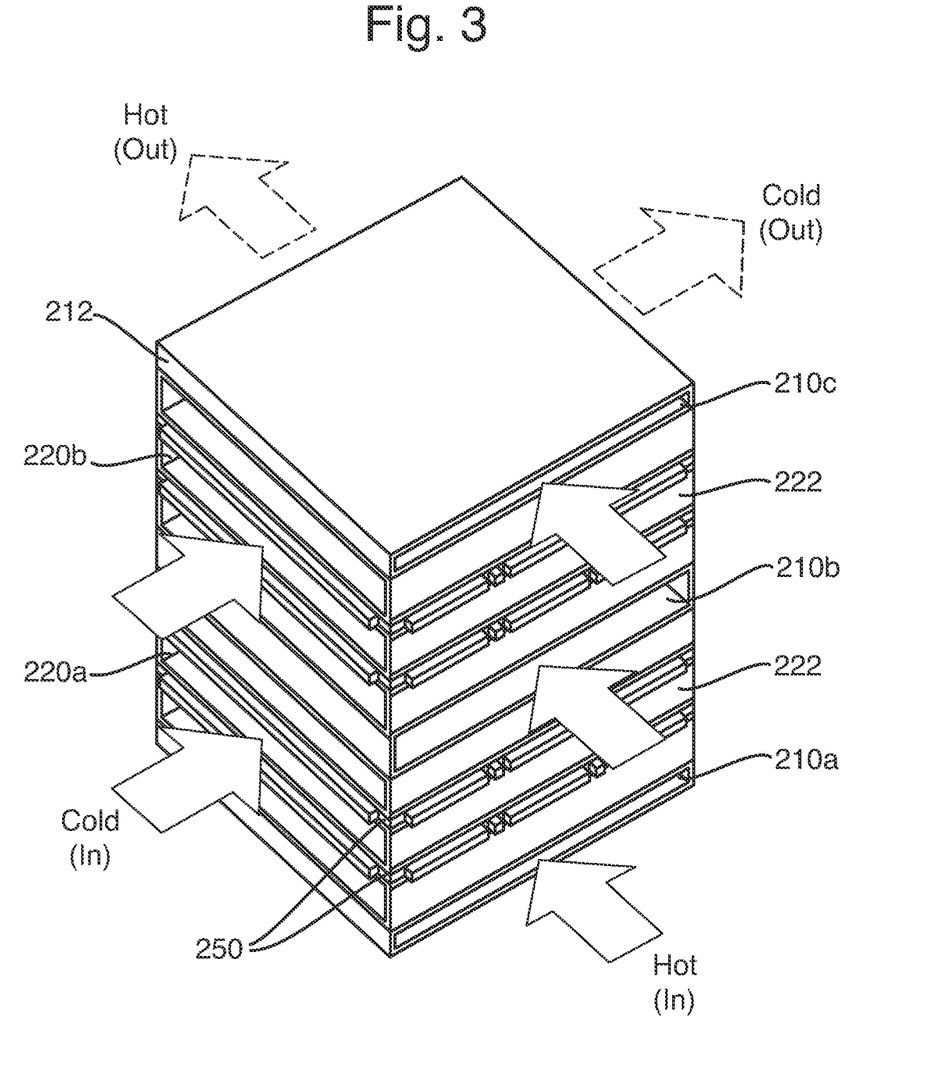
FIG. 3 is a schematic 3 dimensional view of the heat exchanger of FIG. 2.

A heat exchanger assembly 201 according to an embodiment of the invention comprises a laminated stack of air flow channels 210, 220. The air flow channels, which are filled with open-cell aluminium foam, are arranged so as to provide alternating hot flow channels 210 and cold flow channels 220. Disposed between each adjacent hot flow channel 210 and cold flow channel 220 there is provided a heat exchanger 230.

The heat exchangers 230a 230b, 230c and 230d are substantially planar and each comprise a layered arrangement of a heat sink 240a, 240b, 240c and 240d and a thermoelectric device 250a, 250b, 250c and 250d.

Each heat sink 240 comprises open-cell aluminium foam which is combined with a material of high specific heat capacity and latent heat. The material is typically a heat storage wax which is able to take in and store heat efficiently e.g. without a large rise in temperature, due to high specific heat capacity and/or to latent heat, selectable at a suitable melting point (or put more generally, employing materials of e.g. high specific heat capacity/latent heat selected to have desired phase changing point temperatures, e.g. melting point). Any suitable heat-storage wax may be used, for example paraffin wax. The open-cell aluminium foam and the heat-storage material (e.g. wax) are combined in any suitable manner. The terminology "combined with" as used here should be understood to mean physically mixed, integrated, dispersed or the like—i.e. the open-cell aluminium foam occupies, in a three-dimensional mesh or cell-like formation, a certain amount of space within the overall space defined by the heat sink shape, and the wax fills some or all of the remaining space, i.e. fills or partly occupies some or all of the voids within the aluminium foam structure.

Figure 4:
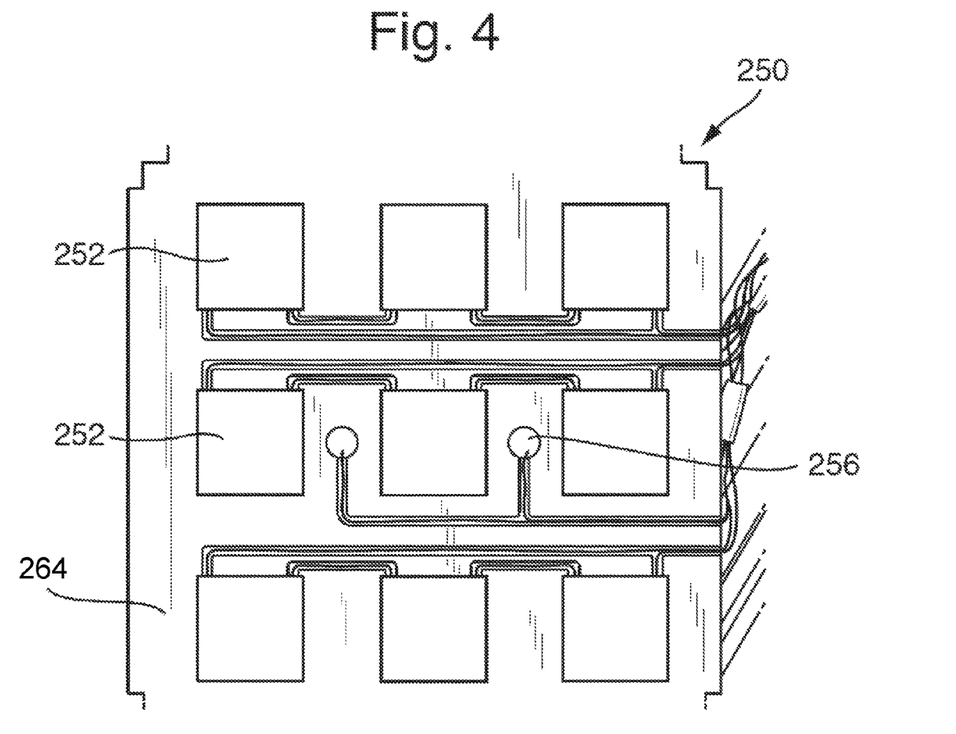
FIG. 4 is an example of a thermoelectric device layer suitable for use in embodiments of the invention.

As shown in FIG. 4, each thermoelectric device 250 comprises an array of peltier devices 252 on a support structure 264. Optionally the peltier 252 devices could be provided with fins extending into the heat sink 240 and/or flow channel 220 to provide an increased surface area. The support structure comprises synthetic resin bonded fibreglass sheet. Some, or each, of the thermoelectric devices 250 may further comprise at least one thermocouple 256. In the example of FIG. 4 two thermocouples 256 are provided on either side of the central thermoelectric device 250. Two further thermocouples (not shown) are also provided on the opposing face of the support structure 264 (for example aligned with the position of the thermocouples 256 on the first face). The thermocouple may be used for monitoring the performance of the heat exchanger and may, for example be used in a closed loop control system.

The arrangement of the stack of the heat exchanger assembly 201, as best seen in FIG. 2, will now be described in more detail. A first hot flow channel 210a is provided and has a thermally conductive support member 214, for example an aluminium plate, defining its upper and lower extents (with foamed aluminium therebetween). A first heat exchanger 230a is provided on top of the first hot fluid flow channel 210a and is arranged such that the open face of the heat sink 240a abuts the first hot fluid flow channel 210a (the closed face being connected to the thermoelectric device 250a of the heat exchanger 230a). The thermoelectric device 250a of the first heat exchanger 230a is spaced apart from the first hot fluid flow channel 210a by the heat sink 240a. A first cold fluid flow channel 220a is provided on top of the first heat exchanger 230a and is arranged such that its lower surface abuts the open face of the thermoelectric device 250a. A second heat exchanger 230b is provided on top of the first cold fluid flow channel 220a and is arranged such that the open face of the thermoelectric device 250b abuts the first cold fluid flow channel 220a (the closed face being connected to the heat sink 240b of the heat exchanger 230b). Accordingly, the heat sink 240b of the second heat exchanger 230b is spaced apart from the first cold fluid flow channel 220a by the thermoelectric device 250b. A second hot fluid flow channel 210b is provided on top of the second heat exchanger 230b and abuts the open face of the heat sink 240b. Further layers are build up in the same fashion, in this particular example a third heat exchanger 230c is followed by a second cold fluid flow channel 230b, a fourth heat exchanger 230d and a third hot fluid flow channel 210c. In all layers of the heat exchanger assembly 201, the thermoelectric cooling device 250 abuts a cold fluid flow channel 220 and the heat sink 240 abuts a hot fluid flow channel 210.

In preferred embodiments the heat exchanger assembly 201 is arranged such that there is a cross flow of hot and cold fluid through the assembly. As shown in FIG. 3, the hot fluid flow channels 210a, 210b and 210c are arranged to be orthogonal to the cold fluid flow channels 220a and 220b. This arrangement allows for a simple flow arrangement into and out of the heat exchanger assembly (for example it may avoid the need to separately duct the flow to the inlet for each fluid flow channel as would be the case if the flows were running in the same direction). The hot fluid flow channels 210a, 210b and 210c are each provided with side walls 212 which face the cold flow and are typically coplanar with the inlets of the cold fluid flow channels 220a and 220b. Thus, cold fluid which is directed towards the appropriate side of the heat exchanger assembly 201 will either enter the cold fluid flow channels 220a, 220b or will impinge upon the side walls 212 of the hot fluid flow channels before being redirected so as to flow into the cold fluid flow channels 220a, 220b. Likewise, the cold fluid flow channels 220a and 220b are each provided with side walls 222 which face the hot flow and are coplanar with the inlets of the hot fluid flow channels 210a, 210b and 210c. Thus, hot fluid which is directed towards the appropriate side of the heat exchanger assembly 201 will either enter the hot fluid flow channels 210a, 210b and 210c or will impinge upon the side walls 222 of the cold fluid flow channels before being redirected so as to flow into the hot fluid flow channels 210a, 210b and 210c. An appropriate thermal jacket will typically be provided around the heat exchanger assembly 201 and will be arranged with inlets and outlets which direct flow to and from the sides of the heat exchanger (i.e. in the directions shown by the arrows in FIG. 3).

In operation the hot fluid (typically air) will flow through the heat exchanger assembly 201 from a first direction and will enter the hot fluid flow channels 210. Heat will transfer from the fluid into the heat exchangers 230 via the heat sinks 240 abutting each channel (as shown by the arrows in FIG. 2). At the same time cold fluid will flow through the assembly 201 through a second direction, which is orthogonal to the first direction, and will enter the cold fluid flow channels 220. Heat will transfer to the fluid from the heat exchangers 230 via the thermoelectric devices 250 abutting each channel (as shown by the arrows in FIG. 2). An electrical current is applied to the thermoelectric devices 250 so as to establish an additional temperature difference between the faces of the thermoelectric devices (which are respectively facing the heat sink 240 of the heat exchanger 230 and the cold fluid flow channel 220). The provision and use of the thermoelectric devices increases the efficiency of the heat transfer across the heat exchanger. Thus fluid flowing out of the hot fluid flow channels 210 has a decreased temperature and fluid flowing out of the cold fluid flow channels 220 has an increased temperature.

Although the invention has been described above with reference to one or more preferred embodiments, it will be appreciated that various changes or modifications may be made without departing from the scope of the invention as defined in the appended claims.

What is claimed is:

1. A modular laminated stacked plate heat exchanger assembly (201) comprising:
   an individual unitary first aluminum hot channel plate (214);
   a first hot fluid flow channel open cell aluminum foam (210a);
   an individual unitary second aluminum hot channel plate (214);
   an individual unitary first hot channel side wall (212); and
   a individual unitary second hot channel side wall (212);
   wherein said first hot fluid flow channel open cell aluminum foam at least partially fills a volume defined by said first aluminum hot channel plate (214), said second aluminum hot channel plate (214), said first hot channel side wall (212), and said second hot channel side wall (212);
   wherein said first hot channel side wall (212) and said second hot channel side wall (212) are placed between said first aluminum hot channel plate (214) and said second aluminum hot channel plate (214), placing said first aluminum hot channel plate (214) and said second aluminum hot channel plate (214) in a spaced-apart relationship;
   thereby forming a first hot fluid flow channel (210a);
   a first heat sink (240a), said first heat sink (240a) formed by a first open cell aluminum foam (240a), wherein voids within said first open cell aluminum foam (240a) are at least partly filled with a phase change material;
   said first heat sink (240a) having a first heat sink open face opposite a first heat sink closed face;
   wherein said first heat sink (240a) open face abuts said second aluminum hot channel plate (214);
   a first thermoelectric cooling device (250a), said first thermoelectric cooling device (250a) having a first thermoelectric cooling device open face and a first thermoelectric cooling device closed face;
   wherein said first thermoelectric cooling device closed face is connected to said first heat sink closed face;
   said first heat sink (240a) and said first thermoelectric cooling device (250a) forming a first heat exchanger (230a);

wherein said first thermoelectric cooling device open face abuts a lower, first, surface of a first cold fluid flow channel (220a);
a second heat exchanger (230b) comprises a second heat sink (240b) and a second thermoelectric cooling device (250b);
said second heat sink (240b) formed by a second open cell aluminum foam (240b), wherein voids within said second open cell aluminum foam (240b) are at least partly filled with a phase change material;
said second heat sink (240b) having a second heat sink open face opposite a second heat sink closed face;
wherein said second heat sink (240b) open face abuts a first aluminum hot channel plate (214) of a second hot fluid flow channel (210b);
said second thermoelectric cooling device (250b) having a second thermoelectric cooling device open face and a second thermoelectric cooling device closed face;
wherein said second thermoelectric cooling device closed face is connected to said second heat sink closed face;
said second thermoelectric cooling device (250b) open face abuts an upper, second, surface of said first cold fluid flow channel (220a), thereby forming said first cold fluid flow channel (220a);
an individual unitary first cold fluid flow channel first side wall (222); and
an individual unitary first cold fluid flow channel second side wall (222);
wherein said first cold channel side wall (222) and said second cold channel side wall (222) are placed between said first thermoelectric cooling device (250a) and said second thermoelectric cooling device (250b), placing said first thermoelectric cooling device (250a) and said second thermoelectric cooling device (250b) in a spaced-apart relationship.

2. A heat exchanger assembly (201) as claimed in claim 1, wherein the fluid flow channels (210, 220) are arranged to provide a cross-flow of the hot and cold fluids.

3. A heat exchanger assembly (201) as claimed in claim 2, wherein the fluid flow channels (210, 220) are arranged such that the flow through the channels is substantially orthogonal.

4. A heat exchanger assembly (201) as claimed in claim 2, wherein the fluid flow channels' (210, 220) side walls (212, 222) are substantially aligned with the inlet of the other of said fluid flow channel (210, 220) to direct fluid flow into the desired flow channel.

5. A heat exchanger assembly (201) as claimed in claim 1, further comprising:
a second hot fluid flow channel (210b); and wherein
the first cold fluid flow channel (220) is disposed between the first (210a) and second (210b) hot fluid flow channels; and
a heat exchanger (230) comprising a heat sink (240) and a thermoelectric device (250) is disposed between both the first hot fluid channel (210a) and the first cold fluid channel (220) and the second hot fluid channel (210b) and the first cold fluid channel (220).

6. A heat exchanger assembly (201) as claimed in claim 1, wherein the flow channels (210, 220) and heat exchanger (230) are provided in a laminated stack.

7. A heat exchanger assembly (201) as claimed in claim 1, wherein at least one of the thermoelectric devices (250) comprises a plurality of devices (252) embedded in or attached to a support structure (264).

8. A heat exchanger assembly (201) as claimed in claim 7, wherein the support structure (264) comprises a thermally insulating layer comprising a synthetic resin bonded fibreglass sheet.

9. A heat exchanger assembly (201) as claimed in claim 1, wherein the heat exchanger (230) further comprises at least one temperature sensor (256).

10. A heat exchanger assembly (201) as claimed in claim 1, wherein a third heat sink (240) abuts a third hot fluid flow channel (210).

11. A heat exchanger assembly (201) as claimed in claim 1, wherein the fluid flow channels (210, 220) further comprise a fin structure.

12. A heat exchanger assembly (201) as claimed in claim 1, wherein at least one thermoelectric device (250) comprises at least one Peltier device.

13. A modular laminated stacked plate heat exchanger assembly (201) comprising: an individual unitary first aluminum hot channel plate (214); a first hot fluid flow channel open cell aluminum foam (210a); an individual unitary second aluminum hot channel plate (214); an individual unitary first hot channel side wall (212); and a individual unitary second hot channel side wall (212); wherein said first hot fluid flow channel open cell aluminum foam at least partially fills a volume defined by said first aluminum hot channel plate (214), said second aluminum hot channel plate (214), said first hot channel side wall (212), and said second hot channel side wall (212); wherein said first hot channel side wall (212) and said second hot channel side wall (212) are placed between said first aluminum hot channel plate (214) and said second aluminum hot channel plate (214), placing said first aluminum hot channel plate (214) and said second aluminum hot channel plate (214) in a spaced-apart relationship; thereby forming a first hot fluid flow channel (210a); a first heat sink (240a), said first heat sink (240a) formed by a first open cell aluminum foam (240a), wherein voids within said first open cell aluminum foam (240a) are at least partly filled with a phase change material; said first heat sink (240a) having a first heat sink open face opposite a first heat sink closed face; wherein said first heat sink (240a) open face abuts said second aluminum hot channel plate (214); a first thermoelectric cooling device (250a), said first thermoelectric cooling device (250a) having a first thermoelectric cooling device open face and a first thermoelectric cooling device closed face; wherein said first thermoelectric cooling device closed face is connected to said first heat sink closed face; said first heat sink (240a) and said first thermoelectric cooling device (250a) forming a first heat exchanger (230a); wherein said first thermoelectric cooling device open face abuts a lower, first, surface of a first cold fluid flow channel (220a); a second heat exchanger (230b) comprises a second heat sink (240b) and a second thermoelectric cooling device (250b); said second heat sink (240b) formed by a second open cell aluminum foam (240b), wherein voids within said second open cell aluminum foam (240b) are at least partly filled with a phase change material; said second heat sink (240b) having a second heat sink open face opposite a second heat sink closed face; wherein said second heat sink (240b) open face abuts a first aluminum hot channel plate (214) of a second hot fluid flow channel (210b); said second thermoelectric cooling device (250b) having a second thermoelectric cooling device open face and a second thermoelectric cooling device closed face; wherein said second thermoelectric cooling device closed face is connected to said second heat sink closed face; said second thermoelectric cooling device (250b) open face abuts an upper, second, surface of said first cold fluid flow channel (220*a*), thereby forming said first cold fluid flow channel (220*a*); an individual unitary first cold fluid flow channel first side wall (222); and an individual unitary first cold fluid flow channel second side wall (222); wherein said first cold channel side wall (222) and said second cold channel side wall (222) are placed between said first thermoelectric cooling device (250*a*) and said second thermoelectric cooling device (250*b*), placing said first thermoelectric cooling device (250*a*) and said second thermoelectric cooling device (250*b*) in a spaced-apart relationship; wherein at least one of the thermoelectric devices (250) comprises a plurality of devices (252) embedded in or attached to a support structure (264); wherein the support structure (264) comprises a thermally insulating layer comprising a synthetic resin bonded fibreglass sheet; wherein the heat exchanger (230) further comprises at least one temperature sensor (256); and wherein at least one thermoelectric device (250) comprises at least one Peltier device.

\* \* \* \* \*